United States Patent Office 3,148,137
Patented Sept. 8, 1964

3,148,137
TREATING HYDROCARBON DISTILLATES
James R. Strong, Des Plaines, Ill., assignor to Universal Oil Products Company, Des Plaines, Ill., a corporation of Delaware
No Drawing. Filed July 11, 1960, Ser. No. 41,802
7 Claims. (Cl. 208—206)

This invention relates to the treatment of hydrocarbon distillates and more particularly to a novel method of oxidizing sour hydrocarbon distillates to convert mercaptans contained therein.

A recently discovered process for treating sour hydrocarbon distillates uses a phthalocyanine catalyst. In this process the sour hydrocarbon distillate is subjected to reaction with an oxidizing agent in the presence of the catalyst and an alkaline solution.

In some cases, treatment of hydrocarbon distillate as, for example, kerosene in the presence of an oxidizing agent, phthalocyanine catalyst and caustic solution has resulted in a kerosene of poor color. For example, a kerosene having an original Saybolt color of about 30 underwent a depreciation in color during such treatment to a Saybolt color of about 11. In the Saybolt scale a color of about 30 is water white and a color of −16 is yellow. For marketable purposes, it is important that the hydrocarbon distillate is of good color and generally requires a Saybolt color of above about 25. We have found that such color depreciation during treatment of the hydrocarbon distillate is minimized when such treatment is combined with acid treating.

In one embodiment the present invention relates to a combination process for treating a sour hydrocarbon distillate to produce a distillate of reduced mercaptan content and of acceptable color which comprises reacting said distillate with an oxidizing agent in the presence of a phthalocyanine catalyst and acid treating said distillate.

In a specific embodiment the present invention relates to a combination process for treating sour kerosene which comprises reacting said kerosene with air in the presence of cobalt phthalocyanine disulfonate catalyst and sodium hydroxide solution, and thereafter subjecting the treated distillate to sulfuric acid treatment.

In another specific embodiment the present invention relates to a process for treating fuel oil which comprises first treating said fuel oil with sulfuric acid and thereafter reacting said fuel oil with air in the presence of vanadium phthalocyanine disulfonate catalyst and sodium hydroxide solution.

From the hereinbefore embodiments, it will be seen that the combination process of the present invention entails the treatment of the hydrocarbon distillate with air and a phthalocyanine catalyst and also acid treatment. As will be shown by the following examples, the combination process of the present invention serves to produce a finally treated product of reduced mercaptan content and of acceptable color. As hereinbefore set forth, a Saybolt color of above about 25 is required and in accordance with the combination process of the present invention, a treated product meeting both the low mercaptan content and high color specifications is obtained.

The novel process of the present invention is used for the treatment of any hydrocarbon distillate. While the process may be used for the treatment of gasoline, naphtha, etc., it is particularly useful for the treatment of hydrocarbon distillates heavier than gasoline, including kerosene, solvent, stove oil, range oil, burner oil, gas oil, fuel oil, etc. In general the kerosene will have an initial boiling point of from about 300° to about 450° F. and an end boiling point of from about 475° to about 550° F. Solvents and stove oil, for example, usually have initial boiling points within the range of from about 350° to about 500° F. and end boiling points of from about 525° to about 600° F.

Any suitable phthalocyanine catalyst may be used in the present invention and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, nickel phthalocyanine, molybdenum phthalocyanine, chromium phthalocyanine, tungsten phthalocyanine, etc. The metal phthalocyanine, in general, is not readily soluble in aqueous solvents and, therefore, when used in an aqueous alkaline solution or for ease of compositing with a solid carrier, a derivative of the phthalocyanine is preferred. A particularly preferred derivative is the sulfonated derivative. Thus, an especially preferred phthalocyanine catalyst is cobalt phthalocyanine sulfonate. Such a catalyst is available commercially and comprises cobalt phthalocyanine disulfonate and also contains cobalt phthalocyanine monosulfonate. Another preferred catalyst comprises vanadium phthalocyanine sulfonate. These compounds may be obtained from any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

Any suitable alkaline reagent may be employed. A preferred reagent comprises an aqueous solution of an alkali metal hydroxide such as sodium hydroxide (caustic), potassium hydroxide, etc. Other alkaline solutions include aqueous solutions of lithium hydroxide, rubidium hydroxide, cesium hydroxide, etc. although, in general, these hydroxides are more expensive and therefore generally are not preferred for commercial use. A preferred alkaline solution is an aqueous solution of from about 1% to about 50% and more preferably 5% to 25% by weight concentration of sodium hydroxide. While aqueous solutions are preferred, it is understood that other suitable solvents may be used including, for example, alcohols, ketones, etc., or mixtures thereof, either as such or diluted with water.

Treating of the hydrocarbon distillate with the phthalocyanine catalyst is effected at any suitable temperature, which may range from ambient to 210° F. when operating at atmospheric pressure or up to about 400° F. or more when operating at superatmospheric pressure. In general it is preferred to utilize a slightly elevated temperature which may range from about 100° F. to about 175° F. Atmospheric pressure or superatmospheric pressure, which may range up to 1000 pounds or more, may be used.

Treatment of the hydrocarbon distillate with the phthalocyanine catalyst is effected in any suitable manner and may be either batch or continuous type of operation. Regardless of which method is used, the phthalocyanine catalyst is employed either as a solution or as a fixed bed.

When the catalyst is employed in solution, the amount of catalyst may range from 10 to 1000 parts per million or more and preferably from about 20 to about 500 parts per million by weight of the alkaline reagent solution. In one embodiment the catalyst previously is prepared as a solution in a suitable solvent including ammoniated water, aqueous sodium hydroxide, etc., and then is introduced in this manner to the oxidation zone. In another embodiment the catalyst is added as such to the oxidation zone, to become dissolved in the alkaline reagent solution therein.

When the catalyst is employed as a fixed bed in the oxidation zone, the catalyst is prepared as a composite with a solid support. Any suitable support may be employed and preferably comprises activated charcoal, coke or other suitable forms of carbon. In some cases the support may comprise silica, alumina, magnesia, etc. or mixtures thereof. The solid catalyst is prepared in any suitable manner. In one method, preformed particles of the solid support are soaked in a solution containing the catalyst, after which excess solution is drained off and the catalyst is used as such or is subjected to a drying treatment, mild heating, blowing with air, hydrogen, nitrogen, etc., or successive treatments using two or more of these operations, prior to use. In other methods of preparing the solid composite, a solution of the phthalocyanine catalyst may be sprayed or poured over the particles of the solid support, or such particles may be dipped, suspended, immersed or otherwise contacted with the catalyst solution. The concentration of phthalocyanine catalyst in the composite may range from 0.1% to 10% by weight or more of the composite.

In a batch type operation, the sour hydrocarbon distillate, alkaline reagent solution and catalyst are disposed in a reaction zone, and air is bubbled therethrough until the desired oxidation is completed. In a continuous type operation, the sour hydrocarbon distillate, alkaline reagent solution and catalyst, when the latter is employed in dissolved form, are supplied to the oxidation zone, preferably at an upper portion thereof, and air is introduced into the reaction zone, preferably at a lower portion thereof. It is understood that the catalyst and alkaline reagent solution may be introduced to the reaction zone either separately or in admixture and either commingled with or separate from the sour hydrocarbon distillate. In a fixed bed continuous process, the catalyst is disposed as a fixed bed in a reaction zone, and the sour hydrocarbon distillate, air and alkaline solution, when desired, are passed into the reaction zone, in upward or downward flow, and either together or separately. Regardless of the particular operation employed, the products are separated to recover treated hydrocarbon distillate of reduced mercaptan content and to separate alkaline reagent solution for reuse in the process. When the soluble catalyst is employed, the catalyst is recovered in admixture with the alkaline reagent solution and is recycled therewith for further use in the process. When desired, additional quantities of phthalocyanine catalyst may be added continuously or intermittently during the treatment of the sour hydrocarbon distillate.

Either preceding or following treatment of the hydrocarbon distillate with the phthalocyanine catalyst, the hydrocarbon distillate is subjected to acid treatment. Any suitable acid may be used and preferably comprises sulfuric acid and more particularly an aqueous solution of sulfuric acid of from about 60% to about 100% concentration. As another advantage of the present process, sulfuric acid which had been used in effecting alkylation reactions may be used for the purposes of the present invention. In the alkylation reaction, an isoparaffin, particularly isobutane and/or isopentane, is reacted with an olefin, particularly propylene and/or butylene, to produce alkylated products. The sulfuric acid used in this process is separated from the hydrocarbons and is referred to in the art as "spent sulfuric acid." It is understood that other suitable spent acids which have been used for the treatment of hydrocarbons or other organic compounds or in other processes also may be used in accordance with the present invention.

While sulfuric acid is preferred in the acid treating step of the present combination process, it is understood that other suitable acids may be employed. Other acids include prosphoric acid, hydrofluoric acid, boron trifluoride solutions, acetic acid, etc. It is also understood that these different acids are not necessarily equivalent in their effectiveness to prevent color depreciation or color stability of the hydrocarbon distillate but all of them will serve to effect a reduction in the loss of color otherwise encountered in the hydrocarbon distillate.

As hereinbefore set forth, the acid treating step may be effected before or after the treatment with phthalocyanine catalyst. When the acid treatment precedes the treatment with phthalocyanine catalyst, it may be desirable to neutralize the acid treated hydrocarbon distillate prior to treatment with the phthalocyanine catalyst. In some cases acid carry-over may occur and accordingly the acid treated gasoline is preferably given a wash with an alkaline reagent solution, particularly sodium hydroxide, potassium hydroxide solution, etc. In one embodiment, the sodium hydroxide solution may be an aqueous solution of from about 2° to about 20° Baumé gravity and the amount of alkaline solution used will be sufficient to neutralize any acid carry-over. When desired, a more concentrated solution of up to 50° Baumé gravity or higher may be used. When the acid treatment follows the treatment with phthalocyanine catalyst, in most cases it is desirable to give the finally treated hydrocarbon distillate an alkaline wash in order to insure that the product is not acidic. Here again the extent of alkaline treatment will depend upon the amount of acid carry-over in the acid treated product.

The acid treating is effected in any suitable manner. In a preferred embodiment a layer of acid is disposed in a reaction zone and the hydrocarbon distillate is passed into contact with the acid, followed by separation of acid treated hydrocarbon distillate from the acid. In another embodiment the acid and hydrocarbon distillate are intimately mixed in a stirred reactor, or the hydrocarbon distillate and acid are passed through orifice mixers or other suitable devices and then allowed to settle and are separately recovered. The acid treating generally is effected at ambient temperature, although an elevated temperature which generally will not exceed about 200° F. may be employed. Either atmospheric pressure or superatmospheric pressure, which generally will not exceed about 500 pounds per square inch, is used.

While the combination process of the present invention is particularly applicable to the treatment of sour hydrocarbon distillates, it is understood that it may be used for the treatment of mercaptan-containing fractions from other sources as, for example, coal tar distillates or other organic fractions as, for example, alcohols, ketones, aldehydes, etc. In still another application, the novel features of the present invention are employed for the oxidation of mercaptans synthetically prepared or recovered as a special fraction containing the mercaptan as a substantial or major portion thereof. In such cases it may be desired to oxidize the mercaptan to the corresponding disulfide.

The following examples are introduced to illustrate further the novelty and utility of the present invention but not with the intention of unduly limiting the same.

EXAMPLE I

The kerosene of this example is a West Texas kerosene having a boiling range of from 357° to 489° F. and a mercaptan sulfur content of 0.1% by weight. The kerosene was first given a caustic wash at ambient temperature. This treatment reduced the mercaptan sulfur only to 0.0982% by weight and the kerosene still was positive to the doctor test.

At the time this particular kerosene was received for treatment, the kerosene had apparently depreciated in color and had a Saybolt color of −5. The caustic treating mentioned above did not improve the color either, as the caustic treated kerosene also had a Saybolt color of −5. The color stability was determined by an accelerated test in which a sample of the kerosene is heated to 212° F. for 20 hours while exposed to the atmosphere. After this accelerated color test, the color of the caustic treated kerosene was −13.

The caustic treated kerosene was then treated with cobalt phthalocyanine catalyst. The cobalt phthalocyanine catalyst was used as a solid bed and comprised a composite of cobalt phthalocyanine sulfonate on activated charcoal and was prepared as follows: The carbon is a commercially available product marketed under the trade name of "Nuchar Type WA" and is supplied in granules of 30–40 mesh. It is stated that the carbon is formed from residual organic material which is recovered during the manufacture of pulp and then is carbonized and activated by heating. An aqueous solution of cobalt phthalocyanine sulfonate was prepared and a trace of ammonium hydroxide (28%) solution was added thereto. The activated carbon granules were poured into the solution, stirred slightly and allowed to stand over night. The following day the mixture was filtered to separate excess water. The resultant solid material was dried over water pump vacuum to leave a dry composite. The filtrate was a faint blue color but was analyzed and found to contain no cobalt. The final catalyst composite contained 1% by weight of the phthalocyanine catalyst.

The catalyst prepared in the above manner was disposed as a fixed bed in a reaction zone and the kerosene, caustic solution and air were passed therethrough at 105° F., utilizing a reactor pressure of 100 pounds per square inch. The caustic solution used in this run was 10° Baumé. The kerosene was charged at a rate of 300 cc. per hour, the caustic solution at 50 cc. per hour and air at a rate of 300 cc. per hour.

Treatment of the kerosene in the above manner reduced the mercaptan sulfur content of the kerosene from 0.0982% to 0.0017% which, in this case, resulted in a product which was negative to the doctor test. However, the kerosene so treated had a color of −5 and a color stability, as determined by the 20 hour accelerated test, of below −16.

EXAMPLE II

Another run was made in substantially the same manner as described in Example I except that the treated kerosene was given a further treatment with sulfuric acid. The treatment with sulfuric acid was effected using 93% sulfuric acid in an amount equivalent to 4 pounds of acid per barrel of kerosene.

The kerosene treated in the above manner was negative to the doctor test and the color was +26 Saybolt. The color stability, determined after the accelerated test described above, also was 26.

From the above data, it is seen that the combination of phthalocyanine catalyst and acid treatments produced a treated kerosene which was both sweet and of acceptable color.

EXAMPLE III

The kerosene of this example was a Middle East kerosene having an initial Saybolt color of +30 and an initial mercaptan sulfur of 0.008% by weight which, in this kerosene, was positive to the doctor test. The kerosene was first acid treated, using sulfuric acid of 96% concentration in an amount equivalent to 8 pounds of sulfuric acid per barrel of kerosene. This treatment was effected at ambient temperature. The acid treated kerosene then was treated with the solid cobalt phthalocyanine sulfonate catalyst prepared as described in Example I. This treatment was effected charging 2300 cc. per hour of kerosene, 50 cc. per hour of caustic solution and 300 cc. per hour of air. The treatment was effected at 105° F. and a reactor pressure of 100 pounds per square inch.

Pertinent data from the above treatments are shown in the following table:

*Table I*

|  | Charge | After Acid Treatment Only | After Acid and Phthalocyanine Treatments |
|---|---|---|---|
| Doctor Test | Positive | Positive | Negative |
| Color, Saybolt | +23 | +30 | +30 |
| Color after 20 hours at 212° F., Saybolt |  | +30 | +27 |

From the data in the above table, it will be seen that the combination of both acid treating and cobalt phthalocyanine catalyst treating, a sweet kerosene of acceptable color was obtained.

When the Middle East kerosene was treated with cobalt phthalocyanine catalyst alone, the color of the treated kerosene was −3 Saybolt and, after the accelerated test, was −16.

EXAMPLE IV

Another series of runs were made in the same manner as described in Example III except that the treatment with phthalocyanine catalyst preceded the acid treatment.

The finally tested kerosene was negative to the doctor test and had a Saybolt color of +21 which also was +21 after the 20 hour accelerated test.

EXAMPLE V

The kerosene used in this example was a Venezuelan kerosene and was first treated with sulfuric acid of 96% concentration in an amount equivalent to 8 pounds of acid per barrel of kerosene. Thereafter the kerosene was treated with a solid cobalt phthalocyanine catalyst in substantially the same manner as described in Example III.

The results of the treatment with acid and with both acid and cobalt phthalocyanine catalyst are reported in the following table:

*Table II*

|  | Charge | After Acid Treatment Only | After Acid and Phthalocyanine Treatments |
|---|---|---|---|
| Doctor Test | Positive | Positive | Negative |
| Color, Saybolt | +4 | +30 | +30 |
| Color after 20 hours at 212° F., Saybolt | −16 | +30 | +30 |

From the data in the above table it will be seen that the kerosene after acid treatment was positive to the doctor test but was of good color. However, the kerosene after both acid treatment and cobalt phthalocyanine catalyst treatment was sweet and of good color.

In another run in which the Venezuelan kerosene was treated with cobalt phthalocyanine catalyst but not with acid, a doctor sweet product was product was produced but the color was +19 Saybolt which depreciated in the accelerated test to −16.

EXAMPLE VI

Another series of runs were made as described in Example V except that the cobalt phthalocyanine treatment preceded the acid treatment. The finally treated kerosene was negative to the doctor test and had a Saybolt color of +30 which, after the accelerated test, was +26.

EXAMPLE VII

Aromatic solvent containing mercaptans is treated with air in the presence of vanadium phthalocyanine sulfonate catalyst at 120° F. and 50 pounds per square inch in a batch type operation. The partly treated solvent then is treated with phosphoric acid at room temperature. The finally treated solvent is negative to the doctor test and is of good color.

I claim as my invention:

1. A combination process for treating a sour hydrocarbon distillate to produce a distillate of reduced mercaptan content and of acceptable color, which comprises subjecting said distillate to both of the following separate treating steps: (1) reacting said distillate with an oxidizing agent in the presence of a phthalocyanine catalyst and (2) treating the distillate with sulfuric acid of from about 60% to about 100% concentration and in sufficient amount to produce a refined distillate having a Saybolt color of above about 25.

2. The process of claim 1 wherein the treatment with phthalocyanine catalyst precedes the treatment with acid.

3. The process of claim 1 wherein the treatment with acid precedes the treatment with phthalocyanine catalyst.

4. A combination process for treating sour kerosene to produce a kerosene of reduced mercaptan content and of acceptable color, which comprises (1) reacting said kerosene with air in the presence of cobalt phthalocyanine sulfonate catalyst and sodium hydroxide solution and thereafter (2) treating the kerosene from the first step with sulfuric acid of from about 60% to about 100% concentration and in sufficient amount to produce a refined kerosene having a Saybolt color of above about 25.

5. A combination process for treating sour kerosene to produce a kerosene of reduced mercaptan content and of acceptable color, which comprises (1) treating said kerosene with sulfuric acid of from about 60% to about 100% concentration and in sufficient amount to produce a refined kerosene having a Saybolt color of above about 25 and thereafter (2) reacting the kerosene with air in the presence of cobalt phthalocyanine sulfonate catalyst and sodium hydroxide solution.

6. A combination process for treating sour kerosene to produce a kerosene of reduced mercaptan content and of acceptable color, which comprises (1) reacting said kerosene with air in the presence of vanadium phthalocyanine sulfonate catalyst and potassium hydroxide solution and thereafter (2) treating the kerosene with sulfuric acid of from about 60% to about 100% concentration and in sufficient amount to produce a refined kerosene having a Saybolt color of above about 25.

7. A combination process for treating sour kerosene to produce a kerosene of reduced mercaptan content and of acceptable color, which comprises (1) treating said kerosene with sulfuric acid of from about 60% to about 100% in concentration and in sufficient amount to produce a refined kerosene having a Saybolt color of above about 25 and thereafter (2) reacting the kerosene with air in the presence of vanadium phthalocyanine sulfonate catalyst and potassium hydroxide solution.

References Cited in the file of this patent

UNITED STATES PATENTS

| | | |
|---|---|---|
| 2,558,863 | Lundquist | July 3, 1951 |
| 2,634,231 | Johnstone | Apr. 7, 1953 |
| 2,912,374 | Maze | Nov. 10, 1959 |
| 2,966,452 | Gleim | Dec. 27, 1960 |